United States Patent
Takahashi et al.

(10) Patent No.: US 6,177,506 B1
(45) Date of Patent: Jan. 23, 2001

(54) METHOD FOR PREPARING HEAT-CURABLE SILICONE RUBBER COMPOUNDS

(75) Inventors: Masaharu Takahashi, Usui-gun; Yutaka Hagiwara, Annaka; Minoru Igarashi, Usui-gun; Keiji Shibata, Annaka, all of (JP)

(73) Assignee: Shin-Etsu Chemical Co., Ltd. (JP)

( * ) Notice: Under 35 U.S.C. 154(b), the term of this patent shall be extended for 0 days.

(21) Appl. No.: 09/148,502

(22) Filed: Sep. 4, 1998

(30) Foreign Application Priority Data

Sep. 5, 1997 (JP) .................................................. 9-257722

(51) Int. Cl.$^7$ ........................................................ C08K 3/36
(52) U.S. Cl. .................... 524/588; 524/492; 264/211.2; 264/211.21; 264/211.23; 264/211; 264/210.6; 366/91
(58) Field of Search ........................... 524/588, 492; 264/211.2, 211.21, 211.23, 211, 210.6; 366/91

(56) References Cited

U.S. PATENT DOCUMENTS 5,198,171 * 3/1993 Kasahara et al. ................ 264/211.23
6,001,917 * 12/1999 Takahashi et al. .................... 524/492

* cited by examiner

*Primary Examiner*—Margaret G. Moore
(74) *Attorney, Agent, or Firm*—Millen, White, Zelano & Branigan, P.C.

(57) ABSTRACT

In a first step, basic components including (A) 100 parts by weight of an organopolysiloxane gum, (B) 5–100 parts by weight of a reinforcing silica filler, and (C) 0.1–30 parts by weight of a processing aid are fed batchwise to a closed mixer for mixing them until uniform. In a second step, the mixture is continuously fed into a kneader/extruder for heat treating. The first step achieves quick dispersion and cooperates with the second step for the efficient production of a heat-curable silicone rubber compound.

17 Claims, No Drawings

METHOD FOR PREPARING HEAT-CURABLE SILICONE RUBBER COMPOUNDS

BACKGROUND OF THE INVENTION

1. Field of the Invention

This invention relates to an efficient method for preparing heat-curable silicone rubber compounds.

2. Prior Art

Heat-cured silicone rubber is improved in weather resistance, durability, heat resistance, physiological activity and colorability. It is used in a variety of applications including building materials, electronic materials, electric materials, business machine parts, automotive parts, and medical parts.

A variety of methods are known for the preparation of heat-curable silicone rubber compounds which heat cure into silicone rubbers. Most customarily, they are prepared using large size, open kneader/mixers having a pair of mixing blades in a chamber.

The kneader/mixers have the advantage that a large amount of mass can be produced in a single pass on account of its maximum capacity reaching several thousands of liters, but the drawback that a long time is needed until the mixture becomes homogeneous, and specifically, the mixing step takes several hours to several tens of hours. The throughput rate at which heat-curable silicone rubber compounds are prepared by means of kneader/mixers can be increased by increasing the size of the apparatus or using a multi-stage apparatus. These modifications, however, are difficult to implement partially because of limits on the installation space.

With respect to the preparation of heat-curable silicone rubber compounds, a number of methods have been investigated for the purpose of improving productivity. For example, JP-A 56736/1989 discloses a continuous production process comprising the step of feeding a diorganopolysiloxane gum to a twin-screw kneader/extruder along with an inorganic filler which has been surface treated with an organic silicon compound under pressure. The drawback of this method is that the pretreatment of the filler takes a long time. JP-A 102007/1990 discloses a continuous production process comprising the steps of continuously pulverizing raw materials in a high-speed shearing machine and feeding them to a continuous twin-screw kneader/extruder. In order to obtain uniform particles, the pulverizing conditions must be strictly controlled. This makes the process complex.

SUMMARY OF THE INVENTION

Therefore, an object of the present invention is to provide a novel and improved method for the efficient preparation of a heat-curable silicone rubber compound through simple steps within a short time.

We have found that when basic components including an organopolysiloxane gum, a reinforcing silica filler, and a processing aid are first fed to a batchwise closed mixer for mixing them into a uniform mixture, and the mixture is continuously fed into a kneader/extruder for continuously heat treating it, the components can be mixed, homogenized and heat treated within a short time and by simple steps and a heat-curable silicone rubber compound having improved curing properties is prepared.

In well-known methods for preparing silicone rubber compounds, a series of steps from mixing and homogenization of raw ingredients to heat treatment are carried out in a kneader/mixer. Since the kneader/mixer is rather incompetent in mixing and homogenization operation, the present invention carries out mixing and homogenization in a batchwise closed mixer capable of achieving homogenization within a short time, as the first step. In the kneader/extruder of the second step, only heat treatment is continuously carried out. The two steps are assigned to the respective apparatus. This enables brief production of silicone rubber compounds, achieving an increased throughput rate.

The invention provides a method for preparing a heat-curable silicone rubber compound, comprising:

a first step of feeding basic components to a batchwise closed mixer for mixing them into a uniform mixture, said basic components including (A) 100 parts by weight of an organopolysiloxane gum, (B) 5 to 100 parts by weight of a reinforcing silica filler, and (C) 0.1 to 30 parts by weight of a processing aid, and a second step of continuously feeding the mixture of the first step into a continuous kneader/extruder for continuously heat treating the mixture.

DETAILED DESCRIPTION OF THE INVENTION

The heat-curable silicone rubber compound to be prepared by the method of the invention is a millable compound containing basic components: (A) an organopolysiloxane gum, (B) a reinforcing silica filler, and (C) a processing aid.

The organopolysiloxane gum as component (A) is preferably a linear high viscosity organopolysiloxane of the general formula (1):

$$R^2(R^1{}_2SiO)_n SiR^1{}_2 R^2 \quad (1)$$

wherein $R^1$ is a monovalent hydrocarbon group having 1 to 10 carbon atoms, $R^2$ is selected from methyl, vinyl and hydroxyl groups, and letter n is a number of at least 1,000.

In formula (1), $R^1$ is selected from substituted or unsubstituted monovalent hydrocarbon groups having 1 to 10 carbon atoms, preferably 1 to 6 carbon atoms. Included are unsubstituted hydrocarbon groups, for example, alkyl groups such as methyl, ethyl, propyl, butyl, pentyl, hexyl, octyl, decyl and dodecyl, alkenyl groups such as vinyl, allyl and butenyl, aryl groups such as phenyl and tolyl, and aralkyl groups such as benzyl and β-phenylethyl, and substituted hydrocarbon groups in which some or all of the hydrogen atoms in the foregoing groups are replaced by halogen atoms or cyano groups, such as 3,3,3-trifluoropropyl and cyanoethyl. Of these, methyl, vinyl, phenyl and 3,3,3-trifluoropropyl are preferred. $R^2$ is selected from methyl, vinyl and hydroxyl groups. Letter n, representative of an average degree of polymerization, is an integer of at least 1,000, preferably 3,000 to 20,000.

With the properties of silicone rubber taken into account, it is preferred that at least 50 mol %, especially at least 80 mol % of the entire $R^1$ and $R^2$ groups in formula (1) be methyl and 0.025 to 0.5 mol %, especially 0.05 to 0.3 mol % of the entire $R^1$ and $R^2$ groups be vinyl.

Component (B) is a reinforcing silica filler which is selected, for example, from fumed silica, fired silica, precipitated silica (or wet silica) and mixtures thereof. Fillers having a specific surface area of at least 50 m²/g are desirable. Such fillers may be used alone or in admixture of two or more.

The silica fillers may have been surface treated with suitable agents, for example, linear organopolysiloxanes, cyclic organopolysiloxanes, hexamethyldisilazane and reactive silanes. Since the reinforcing silica filler becomes expensive on account of the surface treatment, such surface treatment is unnecessary unless it is desired to impart special properties. From the standpoints of transparency and reinforcement of the reinforced silicone rubber, fumed silica having a specific surface area of 100 to 400 m²/g is desirable. From the standpoints of cost, elasticity and physical properties of the reinforced silicone rubber, reinforcing precipitated silica having a specific surface area of 50 to 800 m²/g is especially desirable.

An appropriate amount of the reinforcing silica filler blended is 5 to 100 parts by weight, preferably 10 to 50 parts by weight, per 100 parts by weight of organopolysiloxane (A). Outside this range, less or larger amounts of the filler result in silicone rubber compositions which have poor properties and cure into rubber parts having insufficient mechanical strength (such as tensile strength and tear strength).

Component (C) is a processing aid for improving the dispersibility of the reinforcing silica filler (B) in the silicone rubber and imparting various desirable properties to the silicone rubber. Exemplary are low-molecular weight organic silicon compounds blocked with a hydroxyl group at each end, low-molecular weight organic silicon compounds blocked with an alkoxy group at each end, and silazanes. The processing aid used herein is typically an organic silicon compound represented by the general formula (2):

$$R^4O-(R^3{}_2SiO)_m-R^4 \qquad (2)$$

wherein $R^3$ is a monovalent hydrocarbon group having 1 to 10 carbon atoms, $R^4$ is methyl, ethyl or hydrogen, and letter m is an integer of 1 to 100.

In formula (2), $R^3$ is as defined for $R^1$. Preferably $R^3$ is selected from the group consisting of methyl, vinyl, phenyl, and 3,3,3-trifluoropropyl. $R^4$ is selected from the group consisting of methyl, ethyl and hydrogen, with hydrogen being preferred. Letter m is an integer of 1 to 100, preferably 1 to 20, more preferably 2 to 5.

An appropriate amount of the processing aid (C) blended is 0.1 to 30 parts, preferably 0.2 to 10 parts by weight per 100 parts by weight of organopolysiloxane (A). The processing aids may be used alone or in admixture of two or more.

In the silicone rubber compound according to the invention, there may be added additives if necessary. Such additives include extending fillers such as ground quartz and diatomaceous earth, and other fillers (excluding the aforementioned reinforcing ones) such as calcium carbonate, iron oxide, zinc oxide, titanium oxide, carbon black, barium oxide, magnesium oxide, cerium hydroxide, magnesium carbonate, zinc carbonate, asbestos, glass wool, finely divided mica, and fused silica powder; pigments; heat resistance modifiers such as fatty acid salts of metal oxides; flame retardants such as platinum compounds; and agents for preventing cured products from coloring such as organohydrogenpolysiloxanes. These optional components may be added in conventional amounts insofar as the benefits of the invention are not impaired.

Now the method of the invention is described. In the first step, the above-described components are fed to a batchwise closed mixer where they are mixed until a homogeneous mixture is obtained. As compared with non-closed atmospheric pressure kneader/mixers, the batchwise closed mixer has the advantage that a fully dispersed state can be established within a short time.

The batchwise closed mixer is a mixer having a closed chamber where the contents are mixed under pressure. Exemplary are pressure kneader/mixers, internal mixers, and Banbury mixers.

If desired, the batchwise closed mixer has a cooling or heating function so that the internal temperature during mixing may be maintained in the range from room temperature to about 150° C., more preferably from about 50° C. to about 120° C. The mixing time may be about 1 to about 30 minutes. Above 150° C., the process aid would not perform well.

The mixture resulting from the first step is fed to a kneader/extruder of the second step directly or through a transfer apparatus such as an extruder while optionally heating. Examples of the kneader/extruder include a two-shaft co-rotational kneader available under the trade name of KRC (by Kurimoto Iron Works K.K.), a single-shaft kneader with functions of screw rotation and an axial back and forth motion available under the trade name of Buss Co-Kneader (by Buss K.K.), and a kneader exerting powerful shear action by means of a rotating blade in combination with a stationary blade available under the trade name of KCK (by KCK K.K.).

Preferably, the kneader is provided with a vent which can be evacuated to vacuum for removing volatiles from the mixture that passes through the kneader.

The mixture fed to the kneader is preferably heat treated at a temperature of 150 to 250° C., preferably 150 to 200° C. for about 1 to about 30 minutes (residence time). Below 150° C., a silicone rubber compound having desired physical properties would not be obtained. Temperatures above 250° C. can cause degradation of the silicone rubber compound.

According to the invention, the first step of mixing and homogenization operation, in which conventionally employed kneader/mixers are rather incompetent is carried out by a batchwise closed mixer capable of achieving homogenization within a short time. In the kneader/extruder of the second step, the mixture is continuously heat treated. The two steps are assigned to the respective apparatus and can be accomplished within short duration. A heat-curable silicone rubber compound can be produced through simple steps at an increased throughput rate.

EXAMPLE

Examples are given below together with comparative examples to illustrate the invention, and are not intended to limit the scope thereof. All parts are by weight.

Comparative Example 1

To a pressurizing kneader/mixer were fed basic components: 100 parts of an organopolysiloxane gum end-blocked with a dimethylvinylsiloxy group, consisting of 0.15 mol % of methylvinylsiloxy units and 99.85 mol % of dimethylsiloxy units, and having an average degree of polymerization of about 8,000, 41 parts of wet silica having a specific surface area of about 200 m²/g (Nipsil LP by Nippon Silica K.K.), 3 parts of a linear dimethylsiloxane blocked with a silanol group at each end and having an average degree of polymerization of 3 to 4. The components were kneaded for about 10 minutes under pressure. In this way, the components were mixed into a homogeneous mixture which had a temperature of 60° C.

Example 1

The mixture obtained in Comparative Example 1 was continuously fed at a flow rate of 120 g/min to a kneader/extruder KCK 80x22-35EX(7) (by KCK K.K.) where heat treatment was carried out, yielding a silicone rubber compound. The kneading section was set at a temperature of 200° C., a revolution of 20 rpm, and a residence time of about 10 minutes.

Example 2

The silicone rubber compound obtained in Example 1 was continuously fed to the kneader/extruder KCK which was operated under the same conditions as in Example 1 whereby the compound was heat treated again. There was obtained a silicone rubber compound.

Example 3

The mixture obtained in Comparative Example 1 was continuously fed at a flow rate of 60 g/min to the same kneader/extruder KCK as used in Example 1 where heat treatment was carried out, yielding a silicone rubber compound. The kneading section was set at a temperature of 200° C., a revolution of 20 rpm, and a residence time of about 15 minutes. A vacuum pump was connected to the kneader/extruder immediately upstream of the discharge outlet for effecting deaeration in vacuum.

Comparative Example 2

The mixture obtained in Comparative Example 1 was fed to a 3-liter kneader/mixer where the mixture was heated to a temperature of 180° C. and then heat treated at a temperature of 180 to 190° C. for about 1 hour, yielding a silicone rubber compound. The series of steps took about 1.5 hours.

Comparative Example 3

The same basic components as used in Comparative Example 1 were fed to a 3-liter kneader/mixer where the components were kneaded and mixed for homogenization at a temperature of about 50 to 100° C. for about 1 hour. Thereafter, the temperature was raised and the mixture was heat treated at a temperature of 180 to 190° C. for about 1 hour, yielding a silicone rubber compound. The series of steps took about 3 hours.

Using a roll mill, 100 parts of each of the base compounds obtained in Examples 1–3 and Comparative Examples 1–3 was uniformly compounded with 0.5 part of an organic peroxide, 2,5-dimethyl-2,5-di(t-butylperoxy)-hexane. The compound was press cured at 165° C. for 10 minutes and post cured at 200° C. for 4 hours, obtaining a silicone rubber sheet of 2 mm thick. The sheet was examined by physical tests according to JIS K6301. The results are shown in Table 1.

TABLE 1

|  | Example | | | Comparative Example | | |
| --- | --- | --- | --- | --- | --- | --- |
|  | 1 | 2 | 3 | 1 | 2 | 3 |
| Components |  |  |  |  |  |  |
| Organopolysiloxane gum (pbw) | 100 | 100 | 100 | 100 | 100 | 100 |
| Wet silica (pbw) | 41 | 41 | 41 | 41 | 41 | 41 |
| Silanol-terminated dimethylsiloxane (pbw) | 3 | 3 | 3 | 3 | 3 | 3 |
| Tests |  |  |  |  |  |  |
| Hardness as press-cured | 48 | 47 | 47 | 53 | 48 | 48 |
| Hardness as post-cured | 51 | 49 | 49 | 59 | 50 | 51 |
| Difference between press-cured and post-cured states | 3 | 2 | 2 | 6 | 2 | 3 |
| Tensile strength (kgf/cm$^2$) | 80 | 78 | 77 | 70 | 72 | 70 |
| Elongation (%) | 360 | 360 | 330 | 365 | 280 | 300 |
| Apparatus | pressurizing kneader/mixer ↓ kneader/extruder KCK | pressurizing kneader/mixer ↓ kneader/extruder KCK | pressurizing kneader/mixer ↓ kneader/extruder KCK | pressurizing kneader/mixer | pressurizing kneader/mixer ↓ non-pressurizing kneader/mixer | non-pressurizing kneader/mixer |
| Process time | 20 min. | 30 min. | 25 min. | 10 min. | 1.5 hr | 3 hr. |

As is evident from Table 1, a comparison between Examples and Comparative Examples reveals that the invention is successful in producing a silicone rubber compound having satisfactory cured properties within a significantly reduced period of time. When the silicone rubber compound obtained in Comparative Example 1 without the second step according to the present invention is cured, cured properties are unsatisfactory as demonstrated by greater hardnesses and a greater hardness difference between press-cured and post-cured states.

Example 4

To a Banbury mixer were fed basic components: 100 parts of an organopolysiloxane gum end-blocked with a dimethylvinylsiloxy group, consisting of 0.15 mol % of methylvinylsiloxy units and 99.85 mol % of dimethylsiloxy units, and having an average degree of polymerization of about 8,000, 43 parts of fumed silica having a specific surface area of about 200 m$^2$/g (Aerosil 200 by Nippon Aerosil K.K.), 4 parts of a linear dimethylsiloxane blocked with a silanol group at each end and having an average chain length of 15 to 20, and 4 parts of diphenylsilane diol. The components were kneaded for about 13 minutes under pressure. In this way, the components were mixed into a homogeneous mixture which had a temperature of 90° C. The mixture was continuously fed at a flow rate of 50 g/min. to a kneader/extruder S2-KRC (by Kurimoto Iron Works K.K.) where the mixture was heat treated, yielding a silicone rubber compound. The kneading section was set at a temperature of 180° C., a revolution of 80 rpm, and a residence time of about 2 minutes.

Comparative Example 4

The same basic components as used in Example 4 were fed to a 3-liter kneader/mixer where the components were kneaded and mixed for homogenization at a temperature of about 50 to 100° C. for about 2 hours. Thereafter, the temperature was raised and the mixture was heat treated at a temperature of 180 to 190° C. for about 1 hour, yielding a silicone rubber compound. The series of steps took about 4 hours.

Using a roll mill, 100 parts of each of the base compounds obtained in Example 4 and Comparative Example 4 was uniformly compounded with 0.6 part of an organic peroxide, 2,5-dichlorobenzoyl peroxide. The compound was press cured at 120° C. for 10 minutes and post cured at 200° C. for 4 hours, obtaining a silicone rubber sheet of 2 mm thick. The sheet was similarly examined by the physical tests. The results are shown in Table 2.

TABLE 2

| Component | Example 4 | Comparative Example 4 |
|---|---|---|
| Organopolysiloxane gum (pbw) | 100 | 100 |
| Fumed silica (pbw) | 43 | 43 |
| Silanol-terminated dimethyisiloxane (pbw) | 4 | 4 |
| Diphenyisilane diol (pbw) | 4 | 4 |
| Hardness | 56 | 57 |
| Tensile strength (kgf/cm²) | 115 | 110 |
| Elongation (%) | 400 | 420 |
| Apparatus | Banbury mixer ↓ Kneader/extruder KRC | Non-pressurizing kneader/mixer |
| Process time | 15 min. | 4 hr. |

Japanese Patent Application No. 257722/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing a heat-curable silicone rubber compound, comprising:
    a first step of feeding basic components to a batchwise closed mixer having a closed chamber and mixing them in said closed chamber under pressure into a uniform mixture, said basic components including (A) 100 parts by weight of an organopolysiloxane gum, (B) 5 to 100 parts by weight of a reinforcing silica filler, and (C) 0.1 to 30 parts by weight of a processing aid, and
    a second step of continuously feeding the mixture of the first step into a kneader/extruder and continuously heat treating the mixture.

2. The method of claim 1 wherein the batchwise closed mixer is a pressure kneader/mixer, internal mixer or Banbury mixer.

3. The method of claim 1 wherein the first step is carried out at a temperature in the range of room temperature to 150° C., and the second step is carried out at a temperature in the range of 150° C. to 250° C.

4. A method according to claim 1, wherein said organopolysiloxane gum of component (A) linear organopolysiloxane of formula (1)

$$R^2(R^1{}_2SiO)_nSiR^1{}_2R^2 \quad (1)$$

wherein $R^1$ is in each case independently a substituted or unsubstituted monovalent hydrocarbon group having 1 to 10 carbon atoms, $R^2$ is in each case independently methyl, vinyl or hydroxyl, and n is a number of at least 1,000.

5. A method according to claim 4, wherein $R^1$, in each case, is an unsubstituted monovalent hydrocarbon group of 1 to 10 carbon atoms or a monovalent hydrocarbon of 1 to 10 carbon atoms which is substituted by halogen or cyano.

6. A method according to claim 5, wherein $R^1$ is, in each case independently, methyl, ethyl, propyl, butyl, pentyl, hexyl, octyl, decyl, vinyl, allyl, butenyl, phenyl, tolyl, benzyl, β-phenylethyl, 3,3,3-trifluoropropyl, or cyanoethyl, and n is 3,000–20,000.

7. A method according to claim 4, wherein at least 50 mol % of the entire $R^1$ and $R^2$ groups are methyl and 0.025–0.5 mol % of the entire $R^1$ and $R^2$ groups are vinyl.

8. A method according to claim 1, wherein component (B) is precipitated silica, fumed silica, fired silica, or mixtures thereof, having a specific surface area of at least 50 m²/g.

9. A method according to claim 1, wherein component (B) is fumed silica having a specific surface area of 100–400 m²/g or precipitated silica having a specific surface area of 50–800 m²/g.

10. A method according to claim 1, wherein component (B) is 10–50 parts by weight per 100 parts by weight of component (A).

11. A method according to claim 1, wherein said processing aid of component 3 is an organic silicon compound of the formula (2):

$$R^4O-(R^3{}_2SiO)_m-R^4 \quad (2)$$

wherein
    $R^3$ is, in each case independently, a substituted or unsubstituted monovalent hydrocarbon group having 1–10 carbon atoms,
    $R^4$ is, in each case independently, methyl, ethyl or hydrogen, and
    m is an integer of 1–100.

12. A method according to claim 11, wherein $R^3$, in each case, is an unsubstituted monovalent hydrocarbon group of 1 to 10 carbon atoms or a monovalent hydrocarbon of 1 to 10 carbon atoms which is substituted by halogen or cyano.

13. A method according to claim 12, wherein $R^3$ is, in each case independently, methyl, ethyl, propyl, butyl, pentyl, hexyl, octyl, decyl, vinyl, allyl, butenyl, phenyl, tolyl, benzyl, β-phenylethyl, 3,3,3-trifluoropropyl, or cyanoethyl, and m is 1–20.

14. A method according to claim 11, wherein the amount of said processing aid component C is 0.2–10 parts by weight per 100 parts by weight of component A.

15. A method according to claim 1, wherein said first step is carried out at a temperature of from room temperature to 150° C. for 1–30 minutes.

16. A method according to claim 1, wherein said second step is performed at a temperature of 150–250° C. for 1–30 minutes.

17. A method according to claim 5, wherein said processing aid of component 3 is an organic silicon compound of the formula (2):

$$R^4O-(R^3{}_2SiO)_m-R^4 \quad (2)$$

wherein
    $R^3$ is, in each case, an unsubstituted monovalent hydrocarbon group of 1 to 10 carbon atoms or a monovalent hydrocarbon of 1 to 10 carbon atoms which is substituted by halogen or cyano, $R^4$ is, in each case independently, methyl, ethyl or hydrogen, and m is an integer of 1–100; and component (B) is precipitated silica, fumed silica, fired silica, or mixtures thereof, having a specific surface area of at least 50 $m^2/g$.

* * * * *